United States Patent
Lee et al.

[11] Patent Number: 6,130,533
[45] Date of Patent: Oct. 10, 2000

[54] FAN SPEED DETECTING CIRCUIT

[75] Inventors: Chung-Wang Lee; Ming-Chun Su; Yu-Ping Chung, all of Hsinchu, Taiwan

[73] Assignee: D-Link Corporation, Hsinchu, Taiwan

[21] Appl. No.: 09/270,065

[22] Filed: Mar. 16, 1999

[30] Foreign Application Priority Data

Jan. 6, 1999 [TW] Taiwan .................................. 88200141

[51] Int. Cl.[7] ........................................................ G01P 3/45
[52] U.S. Cl. ........................... 324/177; 318/244; 327/175
[58] Field of Search ....................................... 324/117, 511, 324/222, 76.39, 177; 318/254, 244, 245; 327/68, 72, 172, 175

[56] References Cited

U.S. PATENT DOCUMENTS

| | | |
|---|---|---|
| 4,479,115 | 10/1984 | Holzhauer .............................. 340/611 |
| 4,839,589 | 6/1989 | Heinle ...................................... 324/158 |
| 4,977,375 | 12/1990 | Toth ......................................... 324/511 |
| 5,514,977 | 5/1996 | Agiman .................................... 324/772 |
| 5,811,946 | 9/1998 | Mullin et al. ............................ 318/254 |
| 6,060,879 | 5/2000 | Mussenden ........................... 324/76.39 |

*Primary Examiner*—Hezron Williams
*Assistant Examiner*—Anthony Jolly
*Attorney, Agent, or Firm*—Bacon & Thomas

[57] ABSTRACT

A fan speed detecting circuit includes a resistor installed in the grounding line of the power circuit of the DC fan motor of a cooling fan, a capacitor, a diode connected between the resistor and the capacitor, and a comparator having an inverter terminal connected to the output end of the diode through the capacitor and a non-inverter terminal connected in parallel to the input end of the diode, wherein a transient pulse current is produced at the resistor upon operation of the DC fan motor, causing the comparator to output a pulse frequency wave indicative of the revolving speed of the DC fan motor.

2 Claims, 3 Drawing Sheets

FAN SPEED DETECTING CIRCUIT

BACKGROUND OF THE INVENTION

The present invention relates to a fan speed detector used to detect the revolving speed of a cooling fan, and more particularly to such a fan speed detecting circuit which is comprised of a resistor, a diode, a capacitor, and a comparator, and installed in the power circuit of the DC fan motor of the cooling fan to output a pulse frequency wave indicative of the revolving speed of the DC fan motor.

Regular cooling fans for computers, AC adapters or network apparatus, are commonly comprised of a brushless motor, and a fan blade rotated by the brushless motor. As illustrated in FIG. 1, DC power supply is inputted through an oscillator 11 in the cooling fan 1 to a stator 13, causing a rotary magnetic field to be produced at the stator 13 to rotate a rotor 15. Because the cooling effect of the cooling fan 1 directly affects the stability of the electronic product, the revolving speed of the cooling fan must be maintained at a certain range. If the revolving speed is excessively low, the temperature of the electronic components will rise quickly, causing the electronic product unable to function properly. Therefore, it is important to monitor the revolving speed of the cooling fan. Conventionally, photo chopping circuit means is used and installed in the circuit of the motor of a cooling fan to output a signal indicative of the revolving speed of the cooling fan. However, the installation of the photo chopping circuit means complicates the circuit of the cooling fan, and greatly increases the manufacturing cost of the cooling fan.

SUMMARY OF THE INVENTION

The present invention has been accomplished under the circumstances in view. The fan speed detecting circuit is comprised of a resistor, a diode, a capacitor, and a comparator. The resistor is installed in the grounding line of the power circuit of the DC fan motor of a cooling fan. A transient pulse current is produced at the resistor upon operation of the DC fan motor, causing the comparator to output a pulse wave indicative of the revolving speed of the DC fan motor.

DETAILED DESCRIPTION OF THE PREFERRED EMBODIMENT

Figure 1:
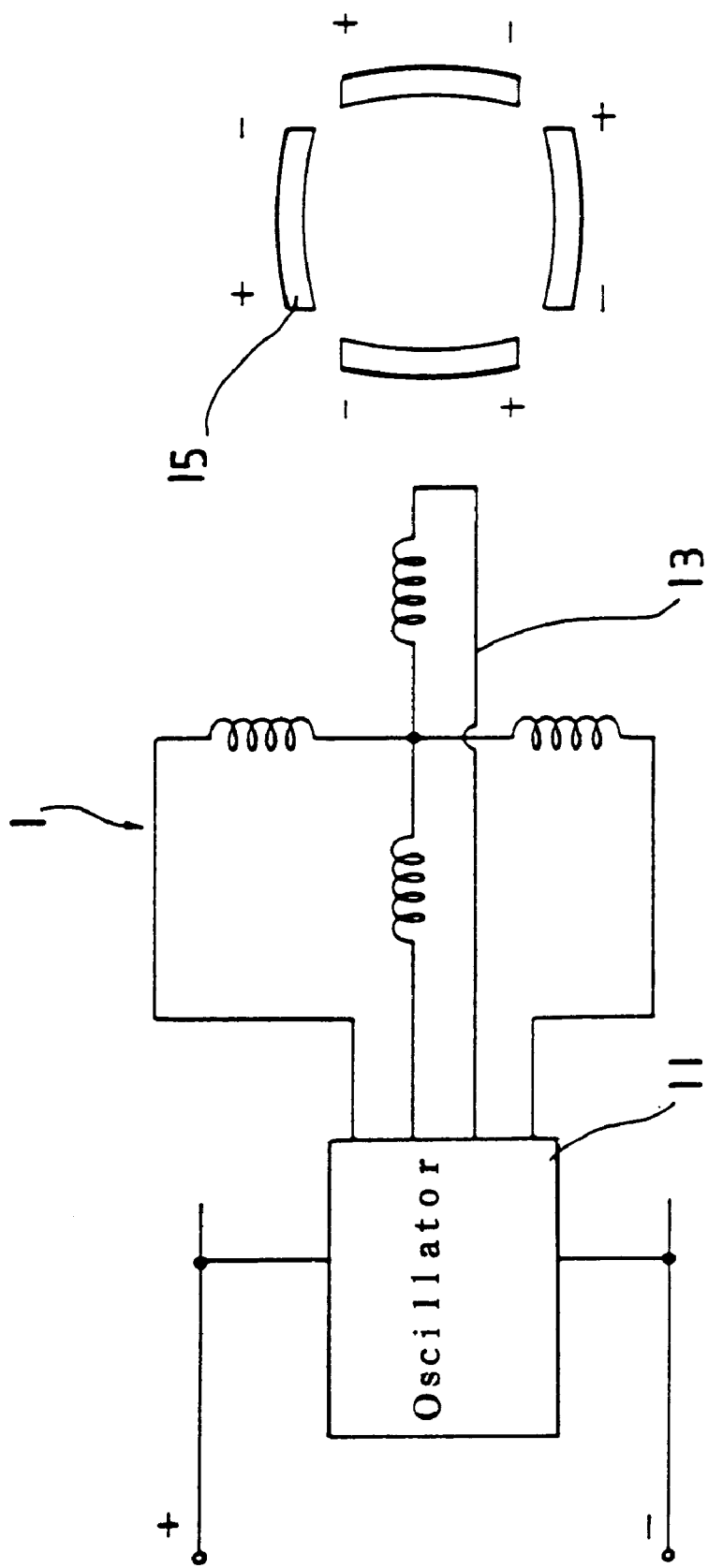
FIG. 1 illustrates the circuit and rotation of the rotor of a cooling fan according to the prior art.
Figure 2:
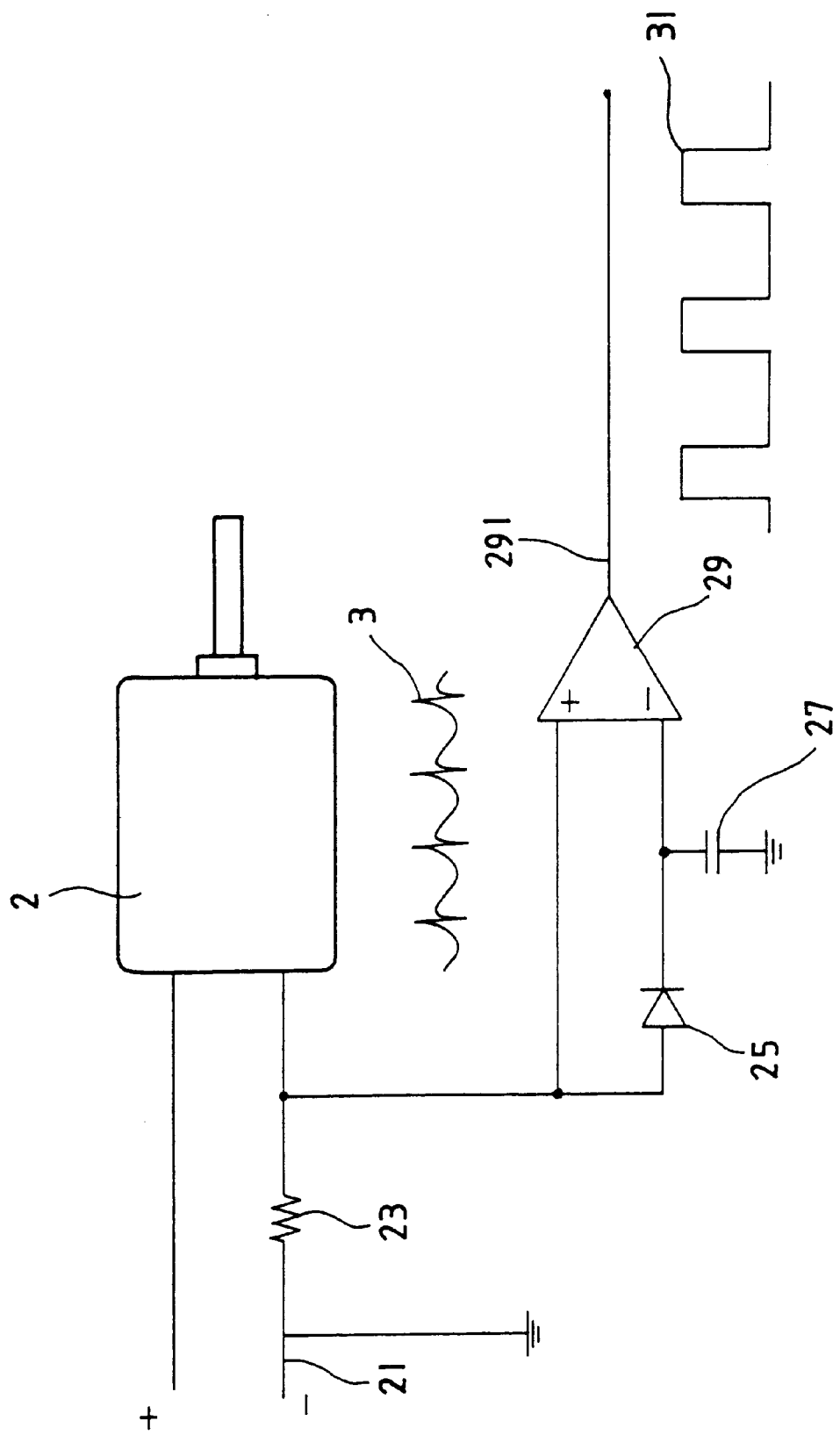
FIG. 2 is a circuit diagram of the present invention.
Figure 3:
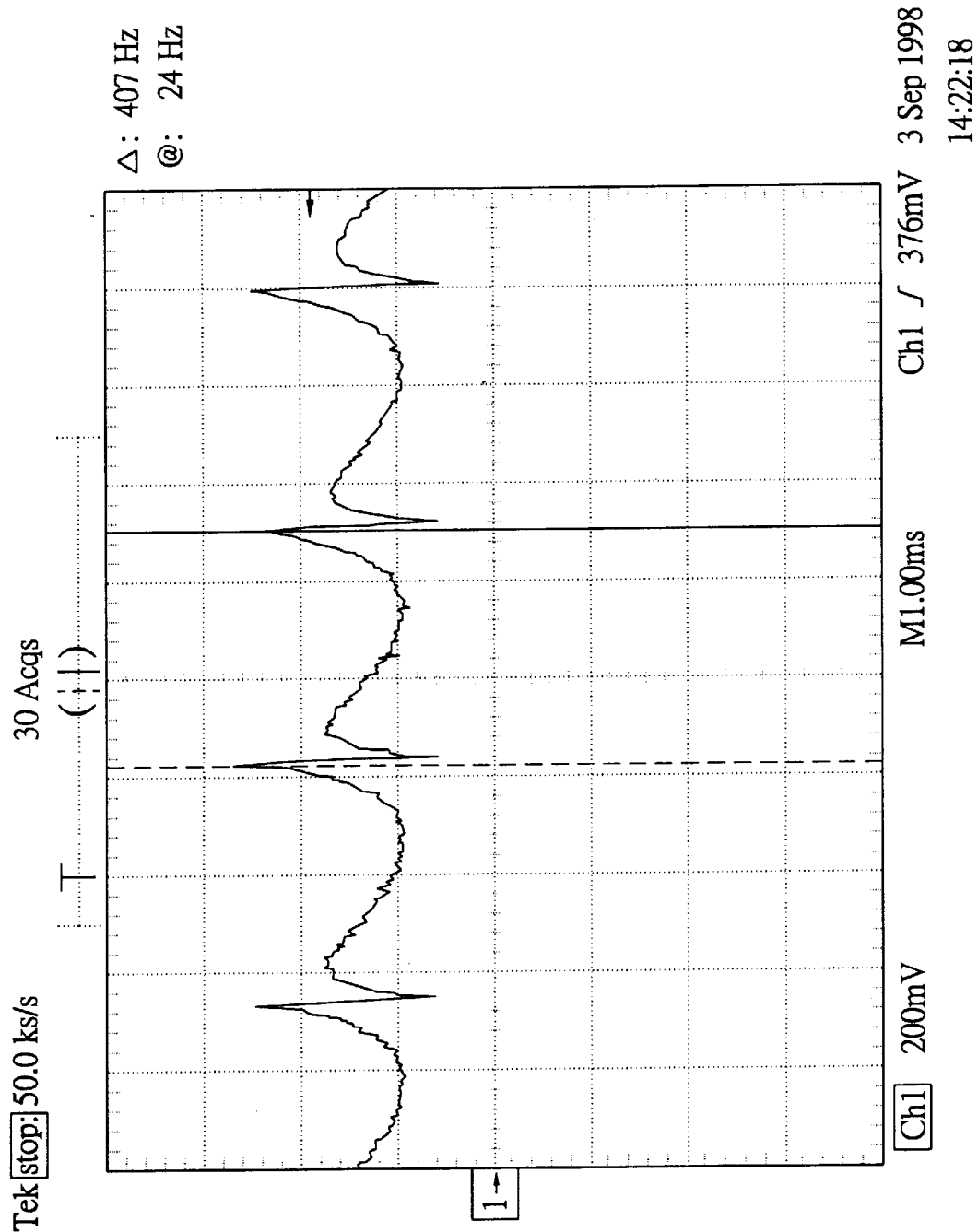
FIG. 3 is a DC motor transient pulse current diagram according to the present invention.

Referring to FIGS. 2 and 3, a fan speed detecting circuit is installed in the power circuit of the fan motor, referenced by 2, to output a pulse signal indicative of the revolving speed of the fan motor 2. The fan speed detecting circuit comprises a resistor 23, a diode 25, a capacitor 27, and a comparator 29. The resistor 23 is installed in the grounding line 21 of the power circuit of the fan motor 2, and connected to the input end of the diode 25. The impedance of the resistor 23 is below 0.5 ohm. The output end of the diode 25 is connected to the inverter terminal of the comparator 29 through the capacitor 27. The non-inverter terminal of the comparator 29 is connected in parallel to the input end of the diode 25.

When the fan motor 2 is started, transient pulse current is received by the fan motor 2, and transmitted to the resistor 23, causing a pulse voltage 3 (see FIGS. 2 and 3) to be produced and transmitted to the comparator 29 via the diode 25 and the capacitor 27, see FIG. 2. When the pulse voltage 3 is transmitted to the comparator 29, a pulse frequency wave 31 which is indicative of the revolving speed of the fan motor 2 is outputted through the output end 291 of the comparator 29.

While only one embodiment of the present invention has been shown and described, it will be understood that the drawings are designed for purposes of illustration only, and are not intended as a definition of the limits and scope of the invention disclosed.

What the invention claimed is:

1. A fan speed detecting circuit installed in the power circuit of a DC fan motor to detect the revolving speed of the fan motor, the fan speed detecting circuit comprising:

a resistor installed in the grounding line of the power circuit of the DC fan motor;

a diode having an input end connected to said resistor and an output end;

a capacitor;

a comparator having an inverter terminal connected to the output end of said diode through said capacitor and a non-inverter terminal connected in parallel to the input end of said diode;

wherein a transient pulse current is transmitted from the DC fan motor to said resistor upon operation of the DC fan motor, and turned into a pulse voltage by said resistor, causing said comparator to output a pulse frequency wave indicative of the revolving speed of the DC fan motor.

2. The fan speed detecting circuit of claim 1 wherein the impedance value of said resistor is below 0.5 ohm.

\* \* \* \* \*